United States Patent
Min et al.

(10) Patent No.: US 11,692,497 B2
(45) Date of Patent: Jul. 4, 2023

(54) ENGINE IGNITION TIMING CONTROL METHOD

(71) Applicants: HYUNDAI MOTOR COMPANY, Seoul (KR); KIA CORPORATION, Seoul (KR)

(72) Inventors: Chan Ki Min, Seoul (KR); Sung Wook Lee, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/696,246

(22) Filed: Mar. 16, 2022

(65) Prior Publication Data
US 2023/0023863 A1     Jan. 26, 2023

(30) Foreign Application Priority Data
Jul. 26, 2021   (KR) .......................... 10-2021-0097980

(51) Int. Cl.
*F02P 5/04*      (2006.01)
*F02D 37/02*     (2006.01)

(52) U.S. Cl.
CPC .............. *F02D 37/02* (2013.01); *F02P 5/045* (2013.01); *F02D 2250/16* (2013.01)

(58) Field of Classification Search
CPC ....... F02D 37/02; F02D 2250/16; F02P 5/045
USPC ............... 123/405.45, 406.48; 701/108, 111; 73/114.31, 114.74
See application file for complete search history.

(56) References Cited

FOREIGN PATENT DOCUMENTS

KR     1020150073405 A1     7/2015

*Primary Examiner* — Hai H Huynh
(74) *Attorney, Agent, or Firm* — Lempia Summerfield Katz LLC

(57) ABSTRACT

An engine ignition timing control method includes: acquiring, by an engine control unit (ECU), intake air humidity of an engine using a humidity sensor; calculating, by the ECU, an amount of first ignition timing correction based on the intake air humidity and an EGR rate; calculating, by the ECU, an amount of second ignition timing correction based on an engine operation region; and correcting, by the ECU, ignition timing of the engine using the amount of first ignition timing correction and the amount of second ignition timing correction.

12 Claims, 5 Drawing Sheets ly related to fuel combustion characteristics in the engine and needs a control strategy based on various conditions to achieve optimum engine efficiency and inhibit knocking and misfiring.

ENGINE IGNITION TIMING CONTROL METHOD

CROSS REFERENCE TO RELATED APPLICATION

The present application claims priority to and the benefits of Korean Patent Application No. 10-2021-0097980, filed Jul. 26, 2021, the entire contents of which are incorporated herein by reference.

BACKGROUND

Field

The present disclosure relates to an engine ignition timing control method.

Description of the Related Art

In a gasoline engine, ignition timing is a controlling factor deeply related to fuel combustion characteristics in the engine and needs a control strategy based on various conditions to achieve optimum engine efficiency and inhibit knocking and misfiring.

The foregoing is only for improving the understanding of the background of the present disclosure and should not be taken as acknowledging that the present disclosure corresponds to the related art that is already known to those of having ordinary skill in the art.

SUMMARY

The present disclosure provides an engine ignition timing control method. Here, by taking into consideration all of external humidity conditions of a vehicle, an Exhaust Gas Recirculation (EGR) rate, and engine operating points of the vehicle, the method may solve problems such as a decrease in an engine efficiency occurring because of not taking humidity into account in the past, knocking in dry climates, and the like. In addition, the method may realize smooth, stable, and efficient fuel combustion in an engine in spite of differences in humidity by region and by season.

According to one aspect of the present disclosure, an engine ignition timing control method may include: acquiring intake air humidity of an engine; calculating an amount of first ignition timing correction according to the intake air humidity and an EGR rate; calculating an amount of second ignition timing correction according to an engine operation region; and correcting ignition timing of the engine using the amount of first ignition timing correction and the amount of second ignition timing correction.

When an EGR of the engine is in operation, the intake air humidity may be acquired from a humidity model according to an amount of EGR gas and an amount of new air.

When the EGR of the engine is not in operation, the humidity measured by the humidity sensor installed in an engine intake system may be used as the intake air humidity.

The amount of first ignition timing correction may be calculated from a map of an amount of correction according to the intake air humidity and the EGR rate.

The amount of second ignition timing correction may be calculated by dividing the cases in which the EGR rate is no less than a predetermined reference EGR rate and less than the predetermined reference EGR rate.

When the EGR rate is no less than the reference EGR rate, the amount of second ignition timing correction may be calculated from a map, prepared for a situation in which the EGR is in operation, of an amount of correction according to an engine speed and an amount of intake air.

When the EGR rate is less than the reference EGR rate, the amount of second ignition timing correction may be calculated from a map, prepared for a situation in which the EGR is not in operation, of an amount of correction according to an engine speed and an amount of intake air.

The reference EGR rate may be set to be able to determine whether the engine is actively performing EGR control or not.

The amount of second ignition timing correction may be: when the EGR rate is no less than the reference EGR rate, calculated from a map of an amount of correction according to an engine speed and an amount of intake air prepared for the situation in which the EGR is in operation; and when the EGR rate is less than the reference EGR rate, calculated from a map, prepared for the situation in which the EGR is not in operation, of the amount of correction according to the engine speed and the amount of intake air, wherein, when the EGR rate belongs to a predetermined reference region including the reference EGR rate, the amount of second ignition timing correction may be calculated from a map from which the amount of second ignition timing correction was calculated just before.

The ignition timing of the engine is advanced by an amount of final ignition timing correction obtained by multiplying the amount of first ignition timing correction and the amount of second ignition timing correction, thereby allowing the ignition timing of the engine to be corrected.

The amount of final ignition timing correction may be limited to be within a range of a predetermined maximum correction value and a minimum correction value.

The method may further include determining whether a diagnosis result of the humidity sensor of an engine intake system is normal, thereby allowing the correcting ignition timing of the engine to be performed only when the humidity sensor is normal.

As described above, by taking into consideration all of external humidity conditions of a vehicle, an Exhaust Gas Recirculation (EGR) rate, and engine operating points, the present disclosure can solve problems such as a decrease in an engine efficiency occurring because of not taking humidity into account in the past, knocking in dry climates, and the like and also can realize smooth, stable, and efficient fuel combustion in an engine in spite of differences in humidity by region and by season.

BRIEF DESCRIPTION OF THE DRAWINGS

The above and other objectives, features, and other advantages of the present disclosure should be more clearly understood from the following detailed description when taken in conjunction with the accompanying drawings, in which.

Figure 1:
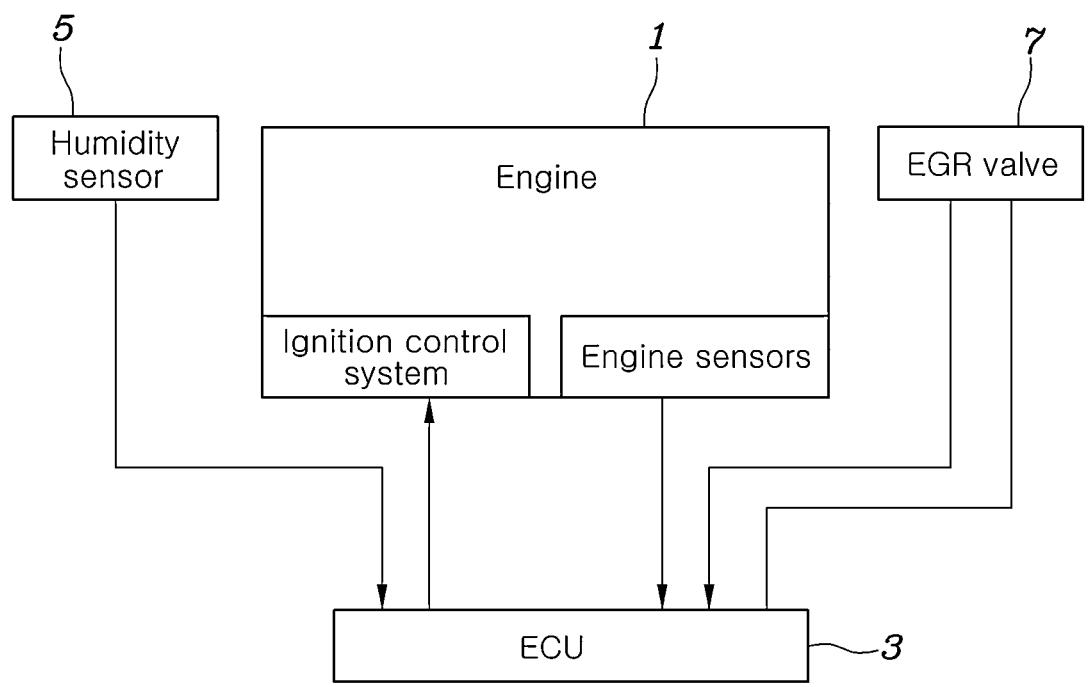
FIG. 1 is a block diagram illustrating an engine system to which the present disclosure may be applied.
Figure 2:
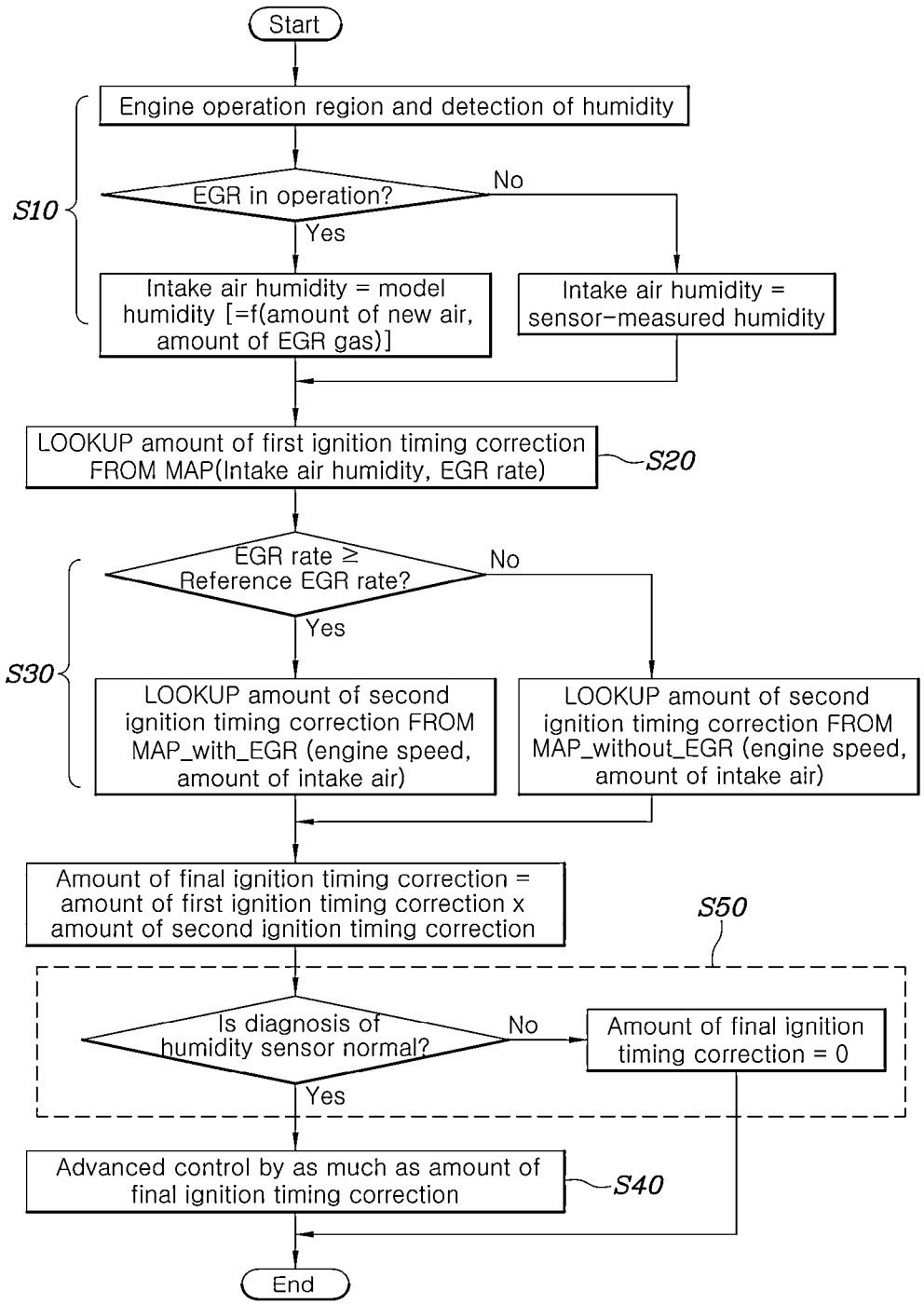
FIG. 2 is a flowchart illustrating an embodiment of an engine ignition timing control method according to an embodiment of the present disclosure.

The drawings described herein are for illustration purposes only and are not intended to limit the scope of the present disclosure in any way.

DETAILED DESCRIPTION OF THE PRESENT DISCLOSURE

Specific structural or functional descriptions for embodiments of the present disclosure are only exemplified for a purpose of describing the embodiments according to the present disclosure. Accordingly, the embodiments according to the present disclosure may be implemented in various forms and should not be construed as being limited to the embodiments described in the present specification or application.

The embodiment according to the present disclosure may have various changes and may have various forms, so specific embodiments are illustrated in the drawings and described in detail in the present specification or application. However, this is not intended to limit the embodiment according to the concept of the present disclosure to a specific disclosed form, and the embodiment should be understood to include all changes, equivalents, or substitutes included in the spirit and scope of the present disclosure.

Terms such as first and/or second may be used to describe various elements, but the elements should not be limited by the terms. The above terms are used only for a purpose of distinguishing one element from another element, for example, without departing from the scope of the present disclosure, a first element may be referred to as a second element, and similarly, the second component may also be referred to as the first component. When a component is referred to as being "connected" or "coupled" to another component, it should be understood that the component may be directly connected or connected to another component, but other components may exist therebetween.

On the contrary, when it is said that a certain element is "directly connected" or "directly coupled" to another element, it should be understood that no other element is present in the middle thereof. Other expressions describing the relationship between elements, such as "between" and "immediately between" or "adjacent to" and "directly adjacent to", and the like should be interpreted in the same manner.

The terms used herein are used only to describe specific embodiments and are not intended to limit the present disclosure. A singular expression includes a plural expression unless the context clearly dictates otherwise.

In the present specification, terms such as "comprise" or "have" are intended to designate that the described feature, number, step, operation, component, part, or a combination thereof exists and includes one or more other features or numbers. It should be understood that the existence or addition of features, numbers, steps, operations, components, parts, or combinations thereof is not precluded in advance.

Unless defined otherwise, all terms used herein, including technical and scientific terms, have the same meaning as commonly understood by one of ordinary skill in the art to which this present disclosure pertains. Terms such as those defined in commonly used dictionaries should be interpreted as meanings consistent with the context of the related art, and unless explicitly defined in the present specification, they are not to be interpreted in an ideal or excessively formal meaning.

Hereinafter, the present disclosure is described in detail by describing exemplary embodiments of the present disclosure with reference to the accompanying drawings. Like reference numerals in each figure indicate like elements.

When a component, device, element, or the like of the present disclosure is described as having a purpose or performing an operation, function, or the like, the component, device, or element should be considered herein as being "configured to" meet that purpose or to perform that operation or function.

FIG. 1 is a conceptual block diagram illustrating an engine system to which the present disclosure may be applied, wherein an engine 1 is controlled by an engine control unit (ECU) 3, and the ECU 3 controls an engine ignition control system on the basis of signals input from a humidity sensor 5 and various sensors mounted on the engine 1. In one form, the ECU may include a processor and a memory configured to store data and a set of instructions implementing a program.

Here, the humidity sensor 5 may be an integrated sensor configured to detect a flow rate, temperature, and the like of new air sucked into an engine intake system. The sensors of the engine 1 may be, for example, a water temperature sensor, an engine speed sensor, a knocking sensor, and the like. An Exhaust Gas Recirculation (EGR) valve 7 is configured such that the opening degree is controlled by the ECU 3 and an amount of an adjusted opening degree is fed back to the ECU 3.

With reference to FIGS. 2 to 5, as an embodiment of the present disclosure, an engine ignition timing control method includes: acquiring, by the ECU, intake air humidity of the engine in S10; calculating, by the ECU, an amount of first ignition timing correction according to the intake air humidity and an EGR rate in S20; calculating, by the ECU, an amount of second ignition timing correction based on an engine operation region in S30; and correcting, by the ECU, ignition timing of the engine using the amount of first ignition timing correction and the amount of second ignition timing correction in S40.

In other words, the engine ignition timing control method of the present disclosure calculates the amount of first ignition timing correction based on the humidity contained in new air sucked into the engine and the EGR rate and calculates the amount of second ignition timing correction according to the engine operation region, thereby allowing the ignition timing of the engine to be corrected using both amounts calculated above. Accordingly, the engine ignition timing control method of the present disclosure may solve problems such as a decrease in an engine efficiency occurring because of not taking the humidity into account in the past, knocking in dry climates, and the like and may also realize smooth, stable, and efficient fuel combustion in an engine in spite of differences in humidity by region and by season.

Here, the engine operation region may be determined based on engine speed and engine load, or may be determined based on the engine speed and an amount of intake air. The engine load may correspond to an amount of accelerator pedal operation.

In the acquiring intake air humidity of the engine in S10, when the EGR of the engine is in operation, the intake air humidity may be calculated by a humidity model based on an amount of EGR gas and an amount of new air flowing into the engine.

In addition, when the EGR of the engine is not in operation, the humidity measured by the humidity sensor of the engine intake system may be acquired as the intake air humidity.

When the EGR is in operation, the gas flowing into the combustion chamber of the engine is a mixture of the fresh air (i.e., the new air) and EGR gas. In order to calculate an amount of ignition timing correction using the intake air humidity in this mixture, the humidity model is prepared in advance and used to calculate the intake air humidity as described above. When the EGR is not in operation, the humidity measured by the humidity sensor installed in the engine intake system is used as the intake air humidity.

The humidity model according to the amount of EGR gas and the amount of new air is prepared through a number of experiments and analyses in advance, and when the amount of EGR gas and the amount of new air are input, the intake air humidity may be calculated accordingly.

Figure 3:
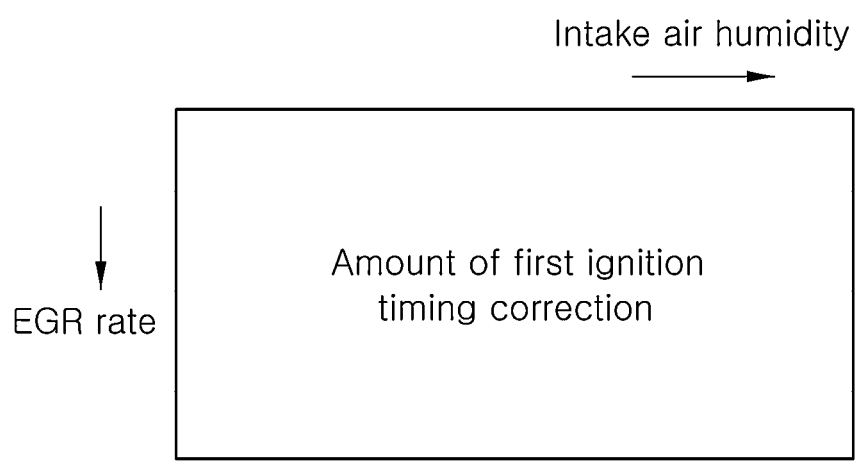
FIG. 3 is a diagram illustrating a map of an amount of first ignition timing correction according to intake air humidity and an EGR rate.
Figure 4:
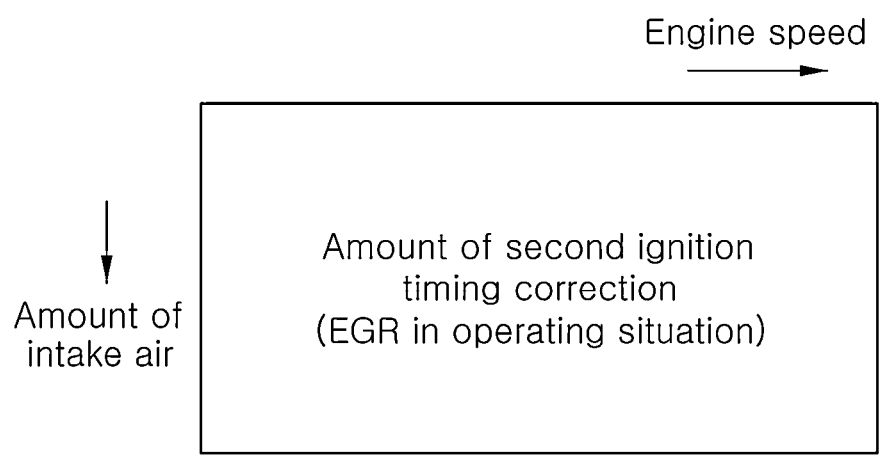
FIG. 4 is a diagram illustrating a map of an amount of second ignition timing correction according to an engine speed and an amount of intake air for a situation in which EGR is in operation.
Figure 5:
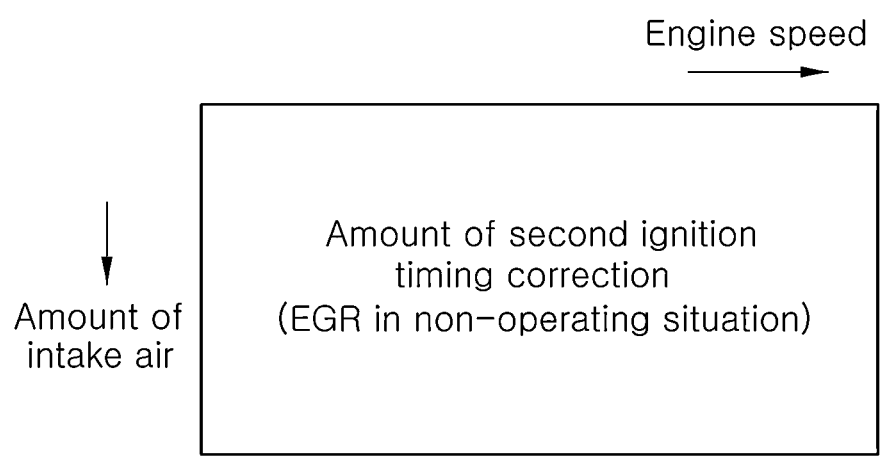
FIG. 5 is a diagram illustrating a map of an amount of second ignition timing correction according to an engine speed and an amount of intake air for a situation in which the EGR is not in operation.

The amount of first ignition timing correction may be calculated from a map of an amount of correction according to the intake air humidity and the EGR rate as shown in FIG. 3.

The map may be made by accumulating data of an appropriate amount of ignition timing correction according to the intake air humidity and the EGR rate through a number of experiments.

In the present disclosure, the amount of the first ignition timing correction according to the intake air humidity and the EGR rate is calculated using the map prepared in advance as described above.

The amount of second ignition timing correction is calculated in different ways according to two cases: a first case in which the EGR rate is equal to or greater than a predetermined reference EGR rate, and a second case in which the EGR rate is less than the predetermined reference EGR rate.

When the EGR rate is equal to or greater than the reference EGR rate, the amount of second ignition timing correction is calculated from a map of the amount of correction, prepared for a situation in which the EGR is in operation, according to the engine speed and the amount of intake air.

In addition, when the EGR rate is less than the reference EGR rate, the amount of second ignition timing correction is calculated from the map of the amount of correction, prepared for a situation in which the EGR is not in operation, according to the engine speed and the amount of intake air.

Here, the reference EGR rate may be set to be able to determine whether the engine is actively performing EGR control or not.

That is, even when the engine is not actively performing the EGR control, EGR gas may be introduced into an intake side of the engine due to leakage and the like of the EGR valve. Therefore, the reference EGR rate may be set to such an extent as to be able to distinguish cases that are not allowed to be regarded as a level at which the actual EGR operation is performed.

Because the engine speed and the amount of intake air eventually specify an operating point of the engine, the amount of second ignition timing correction is the amount of ignition timing correction according to the operating point of the engine. In addition, by calculating the amount of ignition timing correction using a different map depending on whether the EGR is in operation or not, the amount of ignition timing correction is changed also depending on whether the EGR is in operation or not.

The maps of the amount of correction according to the engine speed and the amount of intake air may also be data obtained by performing a number of experiments in distinguishing cases: one case in which the EGR is in operation and another case in which the EGR is not in operation.

In detail, when the EGR rate is equal to or greater than the predetermined reference EGR rate, the amount of second ignition timing correction is calculated from the map of the amount of correction according to the engine speed and amount of intake air prepared for the situation in which the EGR is in operation. Whereas when the EGR rate is less than the predetermined reference EGR rate, the amount of second ignition timing correction is calculated from the map of the amount of correction, prepared for the situation in which the EGR is not in operation, according to the engine speed and the amount of intake air. In particular, when the EGR rate is in a predetermined reference region including the predetermined reference EGR rate, the amount of second ignition timing correction is calculated from the map from which the amount of second ignition timing correction was calculated just before.

If different maps are used according to the EGR rate which frequently changes in a range close to the reference EGR rate, the amount of ignition timing correction of the engine changes rapidly, resulting in a sudden change in the engine operating state. Therefore, as described below, a hysteresis effect is provided to prevent such a situation in which a sudden change in the engine operating state occurs.

For example, when the reference EGR rate is set to 3% and the reference area is set to 1% to 5%, and as the EGR rate is 3.2% in the previous control cycle, the amount of second ignition timing correction is calculated from the map prepared according to the situation in which the EGR is in operation. In this case, even when the EGR rate drops to 2.7% in a current control cycle, the amount of second ignition timing correction is not calculated from the map prepared according to the situation in which the EGR is not in operation, but is to be continuously calculated from the map prepared according to the situation in which the EGR is in operation.

Nevertheless, when the EGR rate drops by less than 1% during a control process as described above, then the amount of second ignition timing correction is calculated from the map prepared according to the situation in which the EGR is not in operation.

Meanwhile, in the correcting ignition timing of the engine in S40, the ignition timing of the engine is advanced by an amount of final ignition timing correction obtained by multiplying the amount of first ignition timing correction and the amount of second ignition timing correction obtained as described above, thereby allowing the ignition timing of the engine to be corrected.

In this case, the amount of final ignition timing correction may be limited to be within a range of a predetermined maximum correction value and a minimum correction value.

For example, when the maximum correction value is 6 degrees and the minimum correction value is −6 degrees, when the amount of final ignition timing correction is 5 degrees, the ignition timing is corrected by 5 degrees as it is, but when the amount of final ignition timing correction is calculated as 8 degrees, the ignition timing is corrected only by the maximum correction value of 6°.

Through this, it is possible, by design, to prevent a situation in which the ignition timing is excessively corrected.

On the other hand, the present disclosure may further include determining whether a diagnosis result of the humidity sensor of the engine intake system is normal in S50, thereby allowing the correcting ignition timing of the engine in S40 to be performed only when the humidity sensor is normal.

Although the present disclosure has been shown and described with reference to the specific embodiments, it should be obvious to those of having ordinary skill in the art that the present disclosure may be variously improved and changed within limitation of not departing from the spirit of the present disclosure.

What is claimed is:

1. An engine ignition timing control method, the method comprising:
    acquiring, by an engine control unit (ECU), intake air humidity of an engine using a humidity sensor;
    calculating, by the ECU, an amount of first ignition timing correction based on the intake air humidity and an exhaust gas recirculation (EGR) rate of the engine;
    calculating, by the ECU, an amount of second ignition timing correction based on an engine operation region; and
    correcting, by the ECU, ignition timing of the engine using the amount of first ignition timing correction and the amount of second ignition timing correction.

2. The method of claim 1, wherein, when an EGR of the engine is in operation, the intake air humidity is acquired from a humidity model according to an amount of EGR gas and an amount of new air.

3. The method of claim 2, wherein, when the EGR of the engine is not in operation, a humidity measured by the humidity sensor installed in an engine intake system is used as the intake air humidity.

4. The method of claim 1, wherein the amount of first ignition timing correction is calculated from a map of an amount of correction based on the intake air humidity and the EGR rate.

5. The method of claim 1, wherein the amount of second ignition timing correction is differently calculated based on whether the EGR rate is equal to or greater than a predetermined reference EGR rate or less than the predetermined reference EGR rate.

6. The method of claim 5, wherein when the EGR rate is equal to or greater than the predetermined reference EGR rate, the amount of second ignition timing correction is calculated from a map of an amount of correction, prepared for a situation in which the EGR is in operation, based on an engine speed and an amount of intake air.

7. The method of claim 5, wherein when the EGR rate is less than the reference EGR rate, the amount of second ignition timing correction is calculated from a map of an amount of correction, prepared for a situation in which the EGR is not in operation, based on an engine speed and an amount of intake air.

8. The method of claim 5, wherein the predetermined reference EGR rate is set to be able to determine whether the engine is actively performing a EGR control or not.

9. The method of claim 5, wherein the amount of second ignition timing correction is:
    when the EGR rate is equal to or greater than the predetermined reference EGR rate, calculated from a map of an amount of correction according to an engine speed and an amount of intake air prepared for the situation in which the EGR is in operation; and
    when the EGR rate is less than the reference EGR rate, calculated from a map of the amount of correction, prepared for a situation in which the EGR is not in operation, based on the engine speed and the amount of intake air,
    wherein, when the EGR rate is in a predetermined reference region including the predetermined reference EGR rate, the amount of second ignition timing correction is calculated from a map from which the amount of second ignition timing correction was calculated just before.

10. The method of claim 1, wherein the ignition timing of the engine is advanced by an amount of final ignition timing correction obtained by multiplying the amount of first ignition timing correction and the amount of second ignition timing correction, thereby allowing the ignition timing of the engine to be corrected.

11. The method of claim 10, wherein the amount of final ignition timing correction is limited to be within a range of a predetermined maximum correction value and a minimum correction value.

12. The method of claim 1, further comprising:
    determining, by the ECU, whether a diagnosis result of the humidity sensor of an engine intake system is normal, thereby allowing the correcting ignition timing of the engine to be performed only when the humidity sensor is normal.

* * * * *